Jan. 10, 1967 P. D. COREY ET AL 3,297,955

PLURAL OSCILLATORS SYNCHRONIZED TO THE HIGHEST FREQUENCY

Filed Sept. 15, 1965 3 Sheets-Sheet 1

INVENTORS
PHILIP D. COREY
EDWARD H. DINGER

BY W. J. Shanley Jr.
THEIR ATTORNEY

INVENTORS
PHILIP D. COREY
EDWARD H. DINGER
BY W. J. Shanley, Jr.
THEIR ATTORNEY

PLURAL OSCILLATORS SYNCHRONIZED TO THE HIGHEST FREQUENCY

Filed Sept. 15, 1965 3 Sheets-Sheet 3

INVENTORS
PHILIP D. COREY
EDWARD H. DINGER
BY W. J. Shanley, Jr.
THEIR ATTORNEY 3,297,955
PLURAL OSCILLATORS SYNCHRONIZED TO THE HIGHEST FREQUENCY

Philip D. Corey, Crozet, and Edward H. Dinger, Waynesboro, Va., assignors to General Electric Company, a corporation of New York Filed Sept. 15, 1965, Ser. No. 487,558
15 Claims. (Cl. 331—55)

This invention relates to circuits utilizing a plurality of oscillators, and more specifically, to circuits for synchronizing a plurality of oscillators.

While not limited to any one application, this invention is particularly useful in circuits where it is desired to operate a pluralty of inverters in parallel to supply a common load. In these circuits it is desired that each of the parallel inverters contributes its proportionate share of the real and reactive components of the load current. Therefore, a discriminator which senses the real component, reactive component, or combination thereof (depending on the particular inverter output impedance) of the load current, is used to adjust the output voltage level of each inverter. This discriminator causes each inverter to assume its share of one component of the load current.

In addition, in prior art circuits, discriminators for sensing the proportion of the load current provided by each inverter which is in quadrature phase with respect to that component sensed to control the voltage regulator are used to adjust the frequency of the inverters. The purpose of these discriminators is to establish a proper phase relationship between the respective inverters in order to secure current balance of the load current controlled by phase difference. However, the phase angle between the inverter circuits is controlled by integrating the frequency of the inverters with respect to time to detect the phase relationship between the inverters. The frequency of the respective inverters is then changed until the integration of the frequency with respect to the time indicates that the phase relationship between the inverter circuits provides current balance. It has been found that this manner of controlling current balance contributes to an instability in the operation of the circuits due to the fact that the frequency of the oscillators is varied to attain the balance.

Therefore, it is an object of this invention to provide a control circuit wherein discriminators directly control the relative phase angle between the outputs of a plurality of load energizers.

It is another object of this invention to provide a control circuit which can adjust the relative phase angle between the outputs of a plurality of oscillators without adjusting the frequency thereof.

In prior art circuits where a plurality of oscillators are synchronized, one of the oscillators is commonly designated as the reference or master oscillator. The frequency of this oscillator determines the frequency at which all the oscillators are synchronized. This master oscillator cannot be removed from the circuit without throwing the remaining oscillators out of synchonization since they are dependent upon it for the synchronizing frequency. The failure of this oscillator causes the remaining oscillators to lose their synchonization.

It is a further object of this invention to provide an improved control circuit for a plurality of oscillators which has no special reference or master oscillator.

It is still another object of this invention to provide a circuit wherein any one of a number of synchronized oscillators may be removed from the circuit without affecting the synchronization of the remaining oscillators.

Another object of this invention is to provide an oscillator control circuit wherein the frequency of a plurality of oscillators is controlled by the highest frequency oscillator.

Briefly stated, and in accordance with one aspect of this invention, each of a plurality of oscillators drives a multivibrator. First and second output means from each multivibrator are connected to gate circuits corresponding to this multivibrator. The first and second output means of each multivibrator are further connected to gate circuits corresponding to the remaining multivibrators. The output from each gate circuit is connected to its corresponding oscillator so that when the highest frequency oscillator drives its multivibrator, the gate circuits of the other oscillators are actuated to cause these oscillators to oscillate at the same rate.

While the specification concludes with claims particularly pointing out and distinctly claiming the subject matter which is regarded as this invention, it is believed that the invention will be better understood from the following description taken in connection with the accompanying drawings in which:

Figure 1:
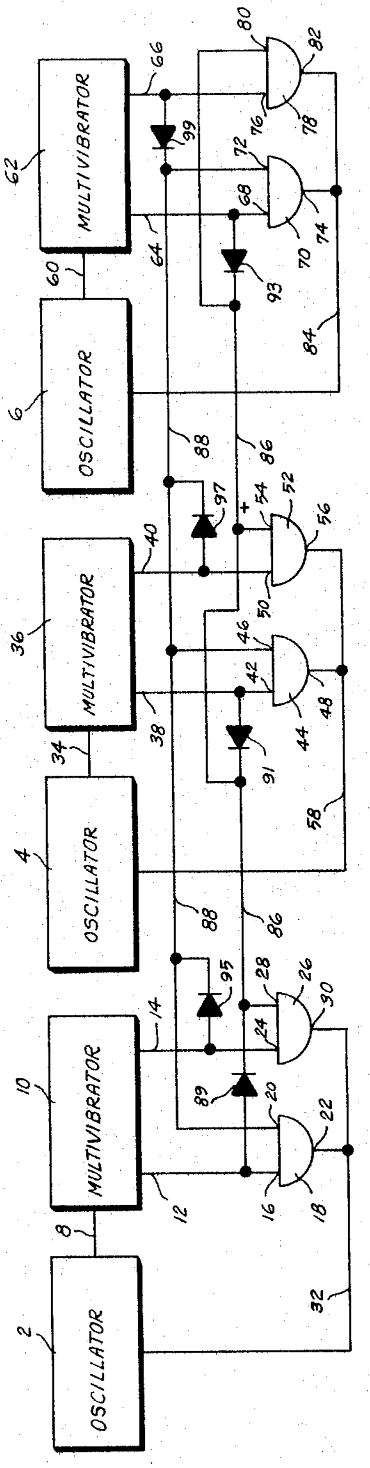
FIGURE 1 is a block diagram showing one embodiment of this invention.

Referring to FIGURE 1, a circuit is shown for synchonizing a plurality of oscillators 2, 4 and 6 by allowing the highest frequency oscillator to control the frequency of the others. Each of the oscillators 2, 4 and 6 has a similar frequency control circuit which is connected in parallel with that of each of the other oscillators. Thus, the oscillator 2 is connected to a coupling means 8 which causes it to drive a multivibrator 10. The coupling means 8 may provide a physical interconnection between the oscillator 2 and the multivibrator 10, or it may provide an interconnection by means of some force such as a magnetic force.

The multivibrator 10 is of the bistable type which provides output signals of opposite polarity at a first output means 12 and a second output means 14. The first output means 12 is connected to a first input terminal 16 of a gate circuit 18 having a second input terminal 20 and an output terminal 22. The second output means 14 is connected to a first input terminal 24 of a gate circuit 26 having a second input terminal 28 and an output terminal 30. Coupling means 32 is provided between the output terminals 22 and 30 of the gate circuits 18 and 26 and the oscillator 2. The first and second output means 12 and 14 and the coupling means 30 may comprise means for physically interconnecting their respective circuits components or for interconnecting them by means of some force, such as magnetic force.

The gate circuits 18 and 26 are shown to be of the AND gate type. A signal occurs at the output terminal of this type of gate circuit whenever the signals at its input terminals are both postive in polarity. However, my invention is not limited to the use of this type of gate circuit. It will be readily apparent to those skilled in the art that other types of gate circuits can be used by modifying the manner in which the various gate circuits and multivibrators are interconnected.

The oscillators 2, 4 and 6 are of the type which have a natural frequency of oscillation. However, this frequency of oscillation can be changed if a signal is applied to a portion of the oscillator during one part of its output cycle. One oscillator of this type is the relaxation oscillator. As will be more fully explained hereinafter with respect to FIGURE 2, the period of oscillation of a relaxation oscillator is determined by the time it takes to charge an energy storage component to a predetermined energy level and then discharge this component when the predetermined level is reached. If a signal is coupled to the oscillator during the charging portion of an oscillator cycle, this signal can synthesize the oscillator conditions which cause the discharge of the energy storage component. The oscillator thus completes its cycle prematurely, changing its frequency of operation, say to that of another oscillator which generated the signal.

Each of the other oscillators and its control circuits is similar to that described for oscillator 2. The oscillator 4 is connected through a coupling means 34 to drive a multivibrator 36. The multivibrator 36 includes a first output means 38 and a second output means 40. The first output means 38 is coupled to a first input terminal 42 of an AND gate circuit 44 having a second input terminal 46 and an output terminal 48. The second output means 40 is connected to a first input terminal 50 of an AND gate circuit 52 having a second input terminal 54 and an output terminal 56. A coupling means 58 is provided between the output terminals 48 and 56 and the oscillator 4.

The oscillator 6 has a similar control circuit. Coupling means 60 interconnect the oscillator 6 with a multivibrator 62 to drive that multivibrator. The multivibrator 62 includes a first output means 64 and a second output means 66. The first output means 64 is connected to a first terminal 68 of an AND gate circuit 70 having a second input terminal 72 and an output terminal 74. The second output means 66 is connected to a first input terminal 76 of an AND gate circuit 78 having a second input terminal 80 and an output terminal 82. Coupling means 84 are provided between the output terminals 74 and 82 and the oscillator 6.

The control circuits of each of the oscillators are connected in parallel. Coupling means 86 are provided for interconnecting each of the first output means 12, 38 and 64 with the second input terminals 28, 54 and 80 of the gate circuits 26, 52 and 78, respectively. Coupling means 88 are provided for interconnecting the second output means 14, 40 and 66 with all of the second input terminals 20, 46 and 72 of the gate circuits 18, 44 and 70, respectively.

A number of diodes are used to prevent signals from one multivibrator from being coupled to another multivibrator, thus diodes 89, 91 and 93 interconnect the first output means 12, 38 and 64, respectively, and the coupling means 86. These diodes, while allowing signals of positive polarity to be coupled to the second input terminals 28, 54 and 80, prevent signals of negative polarity from being coupled to the first output means 12, 38 and 64. For the same reasons, diodes 95, 97 and 99 interconnect the second output means 14, 40 and 66, respectively, with the coupling means 88. Signals of positive polarity may be coupled to the second input terminals 20, 46 and 72.

In operation, the oscillators 2, 4 and 6 can drive their corresponding multivibrators at a frequency which is equal to one-half of the oscillator frequency. During one cycle of the oscillator 2, for example, the polarity of the signals at the first output means 12 and the second output means 14 of the multivibrator 10 changes once. If the first output means 12 is positive in potential relative to the second output means 14 at the beginning of one cycle of the oscillator 2, the first output means 12 becomes negative in potential with respect to the second output means 14 at the end of this cycle. Without any interaction between the frequency control circuits of the oscillators, each oscillator operates independently of the others at its natural frequency of oscillation. However, each oscillator is of the type which can complete its cycle of operation prematurely should a signal be coupled to it from the output terminals of either of its corresponding gate circuits.

Let it be assumed that each of the oscillators 2, 4 and 6 begins its cycle of oscillation simultaneously with the other oscillators. Further, let it be assumed that the first output means 12, 38 and 64 are positive in potential with respect to the second output means 14, 40 and 66. respectively, at the beginning of the first cycle of the oscillators.

Each of the gate circuits produces an output signal whenever the polarity of both of the signals at the first and second input terminals is positive, as explained above.

Referring to the frequency control circuit corresponding to the oscillator 2, it is seen that when the polarity of the signal at the first output means 12 is positive, the first input terminal 16 of the gate circuit 18 is also positive in potential. However, the second input terminal 20 of the gate circuit 18 is negative in potential relative to the first input terminal 16 since it is connected to the second output means 14, 40 and 66, none of which provides a signal which is positive in potential. Therefore, the gate circuit 18 does not provide an output signal. Referring to the gate circuit 26, the second output means 14 couples a negative signal to the first input terminal 24. Thus the gate circuit 26 does not provide an output signal, even though a positive signal is coupled from the first output means 12, 38 and 64 to the second input terminal 28. Similarly, with the first output means 38 and 64 positive in potential, the gate circuits 44 and 52 do not provide an output signal to the oscillator 4 and the gate circuits 70 and 78 do not provide an output signal to the oscillator 6.

Assuming that the oscillator 2 oscillates at the highest frequency, it completes its cycle of oscillation before the oscillators 4 and 6 complete theirs. Thus, the signal at the first output means 12 is now negative in polarity, while the signal at the second output means 14 is positive in polarity.

The positive signal at the second output means 14 is coupled through the coupling means 88 to the second input terminals 46 and 72 of the gate circuits 44 and 70, respectively. Referring to the gate circuit 44, the first and second input terminals are now both positive in potential so that an output signal is coupled from the output terminal 48 and through the coupling means 58 to the oscillator 4. The oscillator 4, nearing the end of its cycle of oscillation, is caused to oscillate by the output pulse. The operation of the gate circuit 44 occurs almost instantaneously with the oscillation of the oscillator 2 so that the oscillator 4 operates in synchronism with the oscillator 2.

Similarly, the positive signal coupled from the first output terminal 14 to the input terminal 72 causes the gate circuit 70 to generate an output pulse at the output terminal 74. This pulse is carried through coupling means 84 to cause the oscillator 6 to operate in synchronism with the oscillator 2.

The oscillation of the oscillators 2, 4 and 6 has changed the potential at the output means of the multivibrator. At this time the second input terminals 20, 46 and 72 and the first input terminals 24, 50 and 76 are held positive in potential by the signals from the second output means 14, 40 and 66, respectively. Since the first output means 12, 38 and 64 are now negative in potential, the first input terminals 16, 42 and 68 and the second input terminals 28, 54 and 80 are also at a negative potential. Therefore, none of the gate circuits are providing output signals. However, the gate circuits are ready to synchronize the oscillators 4 and 6 with the highest frequency oscillator 2 at the end of its next cycle.

It can be appreciated from the above analysis of the circuit operation that the oscillators 4 and 6 are synchronized with the highest frequency oscillator 2 in a similar manner at the end of the next cycle of operation. The multivibrator 10 provides the first output means 12 with a signal which is positive in polarity, thereby providing a positive potential at the second input terminals, 54 and 80. Since the second output means 40 and 66 are still positive in polarity, the oscillators 4 and 6 not having effected a change in the multivibrators 36 and 62 as of yet, the gate circuits 52 and 78 provide output pulses. These output pulses are coupled from the output terminals 56 and 82 and through the coupling means 58 and 84 to drive the oscillators 4 and 6. Therefore, the control circuits cause the oscillators to remain synchronized during a cycle which begins with the first output means 12, 38 and 64 all negative in potential.

Figure 2:
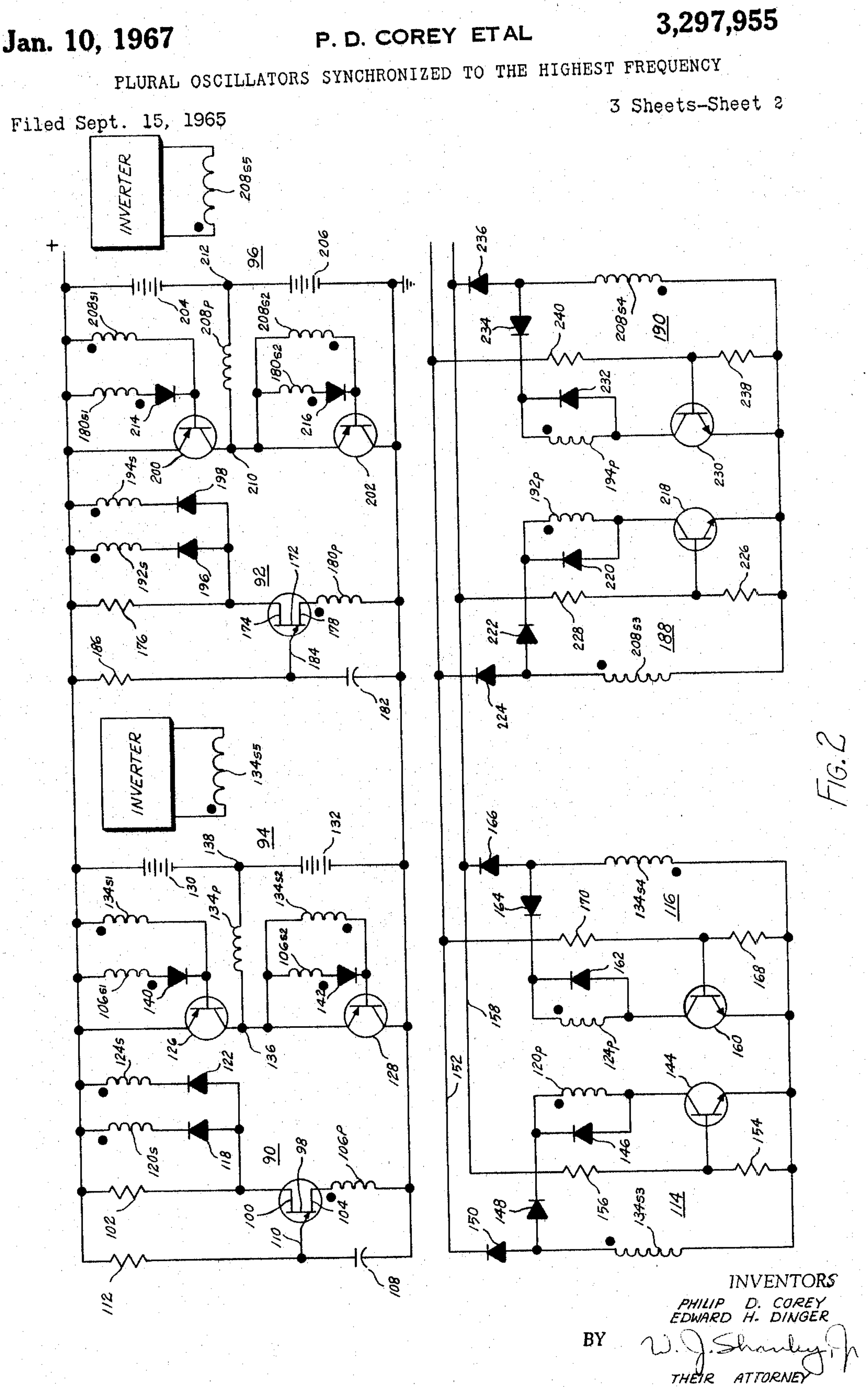
FIGURE 2 is a schematic diagram showing magnetically coupled circuits constructed in accordance with the embodiment shown in FIGURE 1.

FIGURE 2 shows a schematic diagram of a pair of oscillators having control circuits which operate in a manner similar to that described with respect to the circuit shown in FIGURE 1 to drive a pair of inverter loads. A pair of relaxation oscillators 90 and 92 are magnetically coupled to multivibrators 94 and 96, respectively. The relaxation oscillator 90 comprises a unijunction transistor 98 wherein a second base electrode 100 is connected through a resistor 102 to a source of positive voltage. A first base electrode 104 is coupled through a primary winding 106*p* of a transformer 106 to ground. A capacitor 108 is connected between an emitter electrode 110 of the UJT 98 and ground. This capacitor is charged by a positive voltage source through a resistor 112 connected to the emitter 110.

The oscillator 90 further includes a pair of circuits for coupling signals from gate circuits 114 and 116 to the oscillator 90. A first of these circuits includes a rectifier 118 connected in series with a secondary winding 120*s* of a transformer 120 and is connected between the base electrode 100 and the source of positive potential. A second of these circuits includes a rectifier 122 connected in series with a secondary winding 124*s* of a transformer 124 and is connected between the base electrode 100 and the source of positive potential.

The multivibrator 94 includes a pair of transistors 126 and 128 connected in series between the source of positive potential and ground. A pair of batteries 130 and 132 provide the positive potential. A primary winding 134*p* of a transformer 134 is connected between a junction point 136, between the transistors 126 and 128, and a junction point 138 between the batteries 130 and 132. The base-emitter circuit of the transistor 126 includes a rectifier 140 connected in series with the secondary winding 106*s*1 of the transformer 106 between the base and emitter electrodes of the transistor 126. A secondary winding 134*s*1 of the transformer 134 is also connected between the base and emitter electrodes of the transformer 126. Similarly, a rectifier 142 is connected in series with another secondary winding 106*s*2 of the transformer 106 between the base and emitter electrodes of the transistor 128. A second secondary winding 134*s*2 is also connected between the base and emitter electrodes of the transistor 128. Whenever the transistor 126 conducts, the battery 130 is connected across the primary winding 134*p* so that there is a positive potential at the dot end of this winding. However, whenever the transistor 128 conducts the battery 132 is connected across the primary winding 134*p* so that a negative potential is developed at the dot of this winding.

The gate circuits 114 and 116 are magnetically coupled to the multivibrator 94 and the oscillator 90. Thus, the gate circuits can be driven by the multivibrator 94 to generate an output pulse which may affect the trigger point of oscillator 90. The gate circuit 114 comprises a transistor 144 having its collector electrode connected through the parallel combination of a rectifier 146 and a primary winding 120*p* of the transformer 120 to the cathode of a rectifier 148. A secondary winding 134*s*3 of the transformer 134 is connected between the emitter of the transistor 144 and the anode electrode of the rectifier 148 to provide a periodic collector-emitter bias for the transistor 144. A rectifier 150 couples signals of positive polarity from the secondary winding 134*s*3 to a bus 152. A resistor 154 is connected between the emitter and base electrodes of the transistor 144, while a resistor 156 couples signals from a bus 158 to the base electrode of the transistor 144.

The gate circuit 116 is similar to the gate circuit 114. The gate circuit 116 includes a transistor 160 having its collector electrode connected through the parallel combination of a rectifier 162 and a primary winding 124*p* of the transformer 124 to the cathode electrode of a rectifier 164. To provide periodic operating potential for the transistor 160, a fourth secondary winding 134*s*4 of the transformer 134 is connected between the emitter electrode of the transistor 160 and the anode electrode of the rectifier 164. A rectifier 166 couples a positive potential from the secondary winding 134*s*4 to the bus 158. A resistor 168 is connected between the emitter and base electrodes of the transistor 160, while a resistor 170 couples signals from the bus 152 to the base electrode of the transistor 160.

Output signals from the oscillator 90 and its control circuitry, including the multivibrator 94 and the gate circuits 114 and 116, are coupled from the multivibrator 94 to load circuits. As shown in FIGURE 2 a secondary winding 134*s*5 couples output signals to a load circuit which may take the form of an inverter driven by such output signals.

The circuit components comprising the oscillator 92 and its control circuitry are similar to corresponding circuit components which make up the oscillator 90 and its control circuitry. The oscillator 92 includes a unijunction transistor 172 having its second base electrode 174 connected through a resistor 176 to a source of positive potential. A first base electrode 178 is connected through a primary winding 180*p* of a transformer 180 to ground. The transformer 180 has a pair of secondary windings 180*s*1 and 180*s*2 connected in the multivibrator circuit 96. A capacitor 182, connected between ground and an emitter electrode 184 of the UJT 172 is charged by the source of positive potential through a resistor 186. A pair of gate circuits 188 and 190 are coupled through a pair of transformers 192 and 194, respectively, to the oscillator 92. A rectifier 196 is connected in series with a secondary winding 192*s* of the transformer 192 between the first base electrode 174 and the source of positive potential. Similarly, a series circuit comprising a rectifier 198 and a secondary winding 194*s* of the transformer 194 is connected between the first base electrode 174 and the source of positive potential.

In the multivibrator 96 a pair of transistors 200 and 202 comprising the alternately conducting switching components, is connected in series between the source of positive potential and ground. Batteries 204 and 206 comprise the source of positive potential. A primary winding 208*p* of a transformer 208 is connected between a junction point 210 of the transistors 200 and 202 and a junction point 212 of the batteries 204 and 206. The transformer 208 has five secondary windings. A first of the secondary winding 208*s*1 is connected between the base and emitter electrodes of the transistor 200, while a second of the secondary windings 208*s*2 is connected between the base and emitter electrodes of the transistor 202. One of the remaining secondary windings of the transistor 208 is connected in each of the gate circuits 188 and 190. A rectifier 214 is connected in series with the secondary winding 180*s*1 between the base and emitter electrodes of the transistor 200. A rectifier 216 is connected in series with the secondary winding 180*s*2 between the base and emitter electrodes of the transistor 202.

When the transistor 200 conducts it couples the battery 204 across the primary winding 208*p* so that a positive voltage appears at the dot end of this winding. When the transistor 202 conducts it connects the battery 206 across the winding 208*p* so that a negative potential appears at the dot end of this winding.

The gate circuit 188 includes a transistor 218 having a collector electrode coupled through a parallel combination of a primary winding 192p and a rectifier 220 to a cathode electrode of a rectifier 222. A periodic collector and emitter bias is provided for the transistor 218 by the secondary winding 208s3 connected between the emitter of the transistor 218 and the anode electrode of the rectifier 222. A rectifier 224 couples a positive potential from a secondary winding 208s3 to the bus 152. A resistor 226 is connected between the emitter and base electrodes of the transistor 218, while a resistor 228 couples a potential from the bus 158 to the base electrode of the transistor 218.

The gate circuit 190 includes a transistor 230 having its collector electrode coupled through the parallel combination of a rectifier 232 and the primary winding 194p to a cathode electrode of a rectifier 234. A secondary winding 208s4 is connected between the emitter electrode of the transistor 230 and the anode of the rectifier 234 to periodically provide an operating potential across the collector and emitter electrodes of the transistor 230. A rectifier 236 couples signals of positive polarity from the secondary winding 208s4 to the bus 158. A resistor 238 is connected between the emitter and base electrodes of the transistor 230, while a resistor 240 couples a potential from the bus 152 to the base electrode of the transistor 230.

As with the oscillator 90 and its multivibrator circuit 94, output signals may be coupled from the multivibrator circuit 96 in the control circiutry of the oscillator 92 to load circuits. A secondary winding 208s5 couples output signals from the multivibrator circuit 96 to a load circuit which may take the form of an inverter driven by such output signals.

In considering the operation of the oscillator synchronizing circuit shown in FIGURE 2, it will be assumed that each of the oscillators 90 and 92 are beginning a cycle of operation. It will also be assumed that the transistors 126 and 200 of the multivibrator circuits 94 and 96 are both conducting at the beginning of the first cycle of operation. Therefore, the primary windings 134p and 208p are both positive in potential at their dot ends. The secondary winding 134s1 biases the base electrode of the transistor 126 negative in polarity with respect to the emitter electrode of this transistor to keep it turned on. The secondary winding 134s2 reverse biases the base-emitter junction of the transistor 128 to keep it turned off. Similarly, the secondary winding 208s1 forward biases the base-emitter junction of the transistor 200, to keep it turned on, and the secondary winding 208s2 reverse biases the base-emitter junction of the transistor 202 to keep it turned off.

The gate circuits 114 and 116 are biased by the secondary windings 134s3 and 134s4, respectively. The positive potential at the dot end of the secondary winding 134s3 forward biases the collector-emitter junction of the transistor 144 through the rectifier 148 and the primary winding 120p. The rectifier 150 couples this positive potential from the dot end of the secondary winding 134s3 to the bus 152. However, the polarity of the secondary winding 134s4 is reversed with respect to the transistor 160. Consequently, there will be no voltage on the collector-emitter junction of the transistor 160. Therefore, the positive potential at the bus 152, due both to the winding 134s3 and the winding 208s3 as explained hereinafter, does not cause the transistor 160 to become conducting. Neither the rectifier 166 nor the rectifier 236 couples voltage of a positive polarity to the bus 158 at this time, thus the transistor 144 is nonconducting as well. With neither of these transistors conducting, no current can flow through the primary windings 120p and 124p. Therefore, no signals are coupled from the gate circuits 114 and 116 to the oscillator 90 by means of the secondary windings 120s and 124s.

After the battery 204 applies a positive potential at the dot end of the primary winding 208p, the potential across the secondary winding 208s1 forward biases the base-emitter junction of the transistor 200 to keep it conducting. The potential across the secondary winding 208s2 reverse biases the base-emitter junction of the transistor 202 to keep it nonconducting.

Neither of the gate circuits 188 and 190 is conducting at this time. The positive potential at the dot end of the secondary winding 208s3 forward biases the collector-emitter junction of the transistor 218 through the rectifier 222 and the primary winding 192p. The rectifier 224 couples the positive potential from the dot end of the secondary winding 208s3 to the bus 152. The potential across the secondary winding 208s4 reverse biases the collector-emitter junction of the transistor 230. Therefore, the positive potential coupled from the bus 152 by the resistor 240 cannot turn on the transistor 230. Since neither of the rectifiers 166 and 236 is forward biased by the potential at its respective secondary winding, the bus 158 is at its negative most potential. Therefore, the transistor 218 is nonconducting. With no current flow through the transistors 218 and 230, no voltage is induced in the primary windings 192p and 194p. Therefore, no voltage is coupled from the gate circuits 188 and 190 through the secondary windings 192s and 194s, respectively, to affect the cycle of the oscillator 92.

The oscillators 90 and 92 are UJT relaxation oscillators. Using the oscillator 90 as an example, the capacitor 108 is charged by the source of positive potential through the resistor 112. When the voltage across the capacitor 108 reaches a certain percentage of the voltage across the base electrodes 100 and 104, referred to as the stand-off ratio of the UJT, the impedance between the emitter 110 and base one electrode 104 decreases. At this time the capacitor 108 discharges through the primary winding 106p. If at any time before the potential at the capacitor 108 reaches the steady state stand-off ratio, the voltage across the base electrodes 100 and 104 is lowered, the potential of the capacitor 108 reaches the stand-off ratio sooner. Therefore, if a voltage positive at their dot ends is coupled to either of the secondary windings 120s or 124s, the rectifier 118 or 122 conducts to lower the potential at the first base electrode 100. Therefore, the UJT 98 conducts sooner in its cycle of oscillation.

The UJT oscillator 92 operates in a similar manner. Therefore, if a voltage positive at their dot ends is coupled through the secondary winding 192s or 194s, a corresponding rectifier 196 or 198 conducts. As a result the potential across the base electrodes 174 and 178 decreases so that the UJT 172 can conduct earlier in its cycle of operation.

Assuming that the oscillator 90 has a higher natural frequency of oscillation than the oscillator 92, the UJT 98 discharges the capacitor 108 through the primary winding 106p. Therefore, the winding 106p has a positive potential at its dot end. This potential is transformed to the secondary winding 106s1 and 106s2 in the base-emitter circuit of the transistors 126 and 128, respectively. The potential at the winding 106s1 is conducted through the rectifier 140 where it opposes the forward bias applied by the winding 134s1. This potential begins to turn off the transistor 126, which decreases the amount of voltage from the battery 130 which is applied to the primary winding 134p.

As the potential across the winding 134p is decreased, this winding begins to act as a current source attempting to maintain a constant current flow therethrough. The winding 134p becomes less positive in potential at its dot end, thereby decreasing the forward bias applied to the transistor 126 by means of the winding 134s1. The transistor 126 is thereby driven more toward its cut-off state. Finally, the potential at the dot end of the winding 134p becomes negative with respect to the no dot end. At this time the potential applied to the base-emitter junction of the transistor 128 by the winding 134s2 begins to forward bias this transistor. Finally, as the transistor 126 is turned off, the transistor 128 is turned on. The battery 132 is applied across the winding 134*p*. By turning off the transistor 126 and turning on the transistor 128, the potential at the dot end of the winding 134*p* has changed from a positive polarity to a negative polarity.

As the potential at the dot end of the winding 134*p* begins to become negative in polarity, the potential at the dot ends of the secondary windings 134*s3* and 134*s4* in the gate circuits 114 and 116 do likewise. Thus, the secondary winding 134*s3* no longer applies an operating potential across the collector-emitter junction of the transistor 144. Furthermore, the rectifier 150 no longer couples a positive potential to the bus 152. However, the potential at the winding 134*s4* now provides an operating bias across the collector-emitter junction of the transistor 160. The potential from the winding 208*s3*, coupled to the bus 152 through the rectifier 224 turns on the transistor 160 at this time, and a positive potential is induced at the dot end of the winding 124*p*. While a similar potential is also induced in the secondary winding 124*s* in the oscillator circuit 90, the oscillator is substantially unaffected thereby since it is still discharging the capacitor 108 through the winding 106*p*.

The gate circuit 188 is affected in the following manner. The potential at the secondary winding 134*s4* is coupled through a rectifier 166 to the bus 158. This potential is applied through the resistor 228 to forward bias the base-emitter junction of the trasistor 218 in the gate circuit 188. The lower frequency oscillator 92 has not completed its cycle at this time. Therefore, under the assumed initial conditions, the transistor 200 is conducting so that the battery 204 maintains the winding 208*p* positive at its dot end. Thus, the secondary winding 208*s3* is also positive at its dot end, biasing the collector and emitter of the transistor 218 so that this transistor may conduct.

After the transistor 218 begins to conduct current, a positive voltage is induced at the dot end of the primary winding 192*p*. This voltage is transformed to the secondary winding 192*s* in the oscillator circuit 92. This voltage, negative in polarity at the no-dot end, forward biases the rectifier 196 so that this rectifier and the winding 192*s* shunt the resistor 176. Therefore, a voltage is applied between the source of positive potential and the first base electrode 174 which opposes the voltage level of this source. The voltage across the base electrode 174 and 178 is decreased by the amount of voltage at the secondary winding 192*s*. Thus, a smaller voltage is required at the capacitor 182 to reach the stand-off ratio for the UJT 172. The actual activation of the UJT 172 can be made to occur at this time by either causing a relatively large voltage to be induced in the winding 192*s* or by designing the oscillators 90 and 92 for the same frequencies. In either case, the capacitor 182 has charged to a potential near the steady state stand-off ratio when the oscillator 90 completes its cycle. Thus, the oscillator 92 fires in synchronism with the oscillator 90.

The capacitor 182 is discharged by the UJT 172 through the primary winding 180*p* to generate an output signal in the multivibrator 96. This winding 180*p* is now positive in potential at its dot end. That potential is transformed to the secondary windings 180*s1* and 180*s2* in the base-emitter circuits of the transistors 200 and 202, respectively. The positive potential at the dot end of the winding 180*s1* is conducted through the rectifier 214 to the base electrode of the transistor 200 where it counteracts the forward biasing potential applied by means of the winding 208*s1*. Therefore, the transistor 200 begins to turn off in the same manner as did the transistor 126 in the multivibrator 94. As the transistor 200 is turned off, a lesser portion of the potential from the battery 204 is applied across the winding 208*p*. Thus, the winding 208*p* becomes a current generator through inductive action and starts to become negative in potential at its dot end. The potential at the secondary winding 208*s1* turns off the transistor 200 and the potential at the secondary winding 208*s2* forward biases the base-emitter junction of the transistor 202 to turn it on. Therefore, the multivibrator 96 completes its change of conduction state. The transistor 202 conducts fully so that the battery 206 is applied across the winding 208*p*. An output pulse is applied through the winding 208*s5* to the inverter load.

The negative potential now at the dot end of the winding 208*p* is transformed to the secondary windings 208*s3* and 208*s4* in the gate circuits 188 and 190. The negative potential at the dot end of the winding 208*s3* causes the transistor 218 to turn off. The voltage induced in the winding 192*p* while the transistor 218 is turning off, is free wheeled through the rectifier 220. The positive potential induced in the no-dot end of the secondary winding 208*s4* in the gate circuit 190 biases the transistor 230 through rectifier 234 so that this transistor can conduct. However, at this time neither the rectifier 150 nor the rectifier 234 applies a positive potential to the bus 152. For this reason, the base emitter junctions of the transistors 160 and 230 are not forward biased and cannot conduct. Thus, the gate circuits 116 and 190 do not provide output pulses.

The polarity of the voltage at the dot ends of the windings 134*p* and 208*p* is now reversed. Thus, the windings 134*s4* and 208*s4* provide a positive potential at the bus 158 through the rectifiers 166 and 236, respectively. Thus, the base emitter junctions of the transistors 144 and 218 are forward biased. The gate circuits 114, 116, 188 and 190 are ready to synchronize the firing of the oscillators 90 and 92 once again. Therefore, when the higher frequency oscillator conducts, the other oscillator is synchronized with it in a manner similar to that described above.

It will be readily apparent to those skilled in the art that any number of oscillators and control circuits may be added to the circuit shown in FIGURE 2. Each of these circuits must contain an oscillator, a multivibrator and a pair of gate circuits which are similar to those shown. Each of the other oscillators is synchronized with the highest frequency oscillator. Any one oscillator and its control circuit may be removed from the total circuit without affecting the fact that the remaining oscillators are synchronized with that having the highest natural frequency of oscillation.

When one or more oscillators as shown in FIGURE 2 are already operating, it may be desirable to add another oscillator and control circuit in parallel with them. For example, it may be desirable to add another inverter circuit to one or more inverter circuits which are supplying current to a common load. It is therefore desirable that the added inverter circuit be operated in synchronism with those already supplying current to the load. When the oscillator which controls the additional inverter circuit is added in parallel with the oscillators 90 and 92 and their control circuits, these control circuits immediately try to synchronize the added oscillator circuit with the parallel oscillator circuits. These control circuits attempt to trigger the added oscillator regardless of its phase position relative to the other oscillator circuits. At the same time, the control circuit for the added oscillator attempts to bring the other oscillators into synchronism with itself. Such a rapid shift in the phase of any inverter circuit might cause a commutation failure in that inverter. Should this occur, the oscillator and control circuits for that inverter would lose control of the inverter.

For this and other reasons it is desirable to limit the length of time per cycle of inverter frequency during which the oscillator for that inverter can attempt to trigger the oscillators of other inverters.

Figure 3:
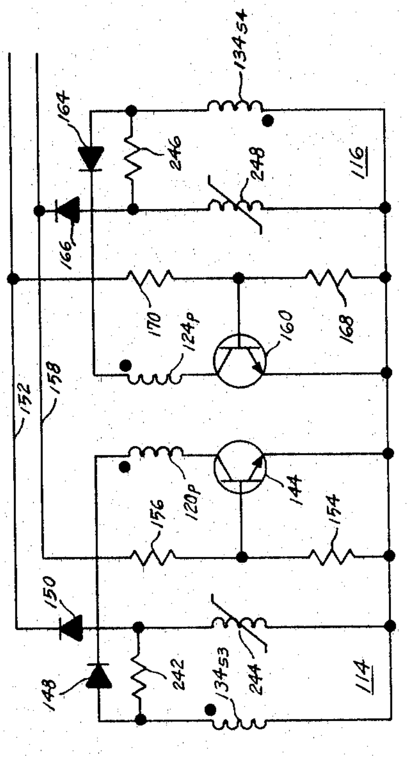
FIGURE 3 is a schematic diagram showing gate circuits which may be used in accordance with one aspect of this invention.

FIGURE 3 shows a modification of the gate circuits, such as 114 and 116, which shortens the length of synchronizing pulses coupled to the oscillator 90 so that they can only affect a corresponding oscillator circuit at a certain portion of its cycle. In the circuit shown in FIGURE 3, circuit components which correspond to those described with respect to FIGURE 2 are numbered accordingly. In the gate circuit 114 a resistor 242 and a saturable winding 244 are connected in series across the winding 134_s_3. Similarly, a resistor 246 and a saturable winding 248 are connected in series across the secondary winding 134_s_4. The anode of the rectifier 150 is connected between the resistor 242 and the saturable winding 244, while the cathode is connected to the bus 152. The anode of the rectifier 166 is connected between the junction of the resistor 246 and the saturable winding 248 and the bus 158.

As a result of adding the resistor 242 and the saturable winding 244 in parallel with the winding 134_s_3, a positive potential at the dot end of this winding, such as that possibly caused by a corresponding multivibrator circuit, drives the saturable reactor 244 toward saturation in a first direction. When a positive potential at the bus 158 is coupled through the resistor 156, it forward biases the base-emitter junction of the transistor 144. The positive potential at the dot end of the winding 134_s_3 is also coupled through the rectifier 148 to bias the transistor 134 so that it can conduct. A positive potential is coupled from the saturable winding 244 to the bus 152 where it can affect the state of conduction of other gate circuits to cause them to fire their corresponding oscillators.

However, when the cumulative volt-seconds applied to winding 244 by the voltage across winding 134_s_3 causes the reactor to saturate in its first direction, the impedance of the reactor decreases appreciably, thereby causing the voltage across saturable winding 244 to decrease to a very low value. Resistor 242 limits the current flow into saturable winding 244 after winding 134_s_3 has saturated. At this time, and for the remainder of the half cycle during which winding 134_s_3 is positive at its dot end, no voltage is transmitted from saturable winding 244 to bus 152 through diode 150. Consequently for the remainder of the half cycle, this circuit will not be able to affect the state of conduction of other gate circuits. Thus the synchronizing signal transmitted by the oscillator is shortened to a pulse whose width is controlled by the design of saturable winding 244.

When the potential at the dot end of the winding 134_s_3 becomes negative in polarity, current flowing from this winding drives the saturable winding 244 back toward saturation in the second direction. Therefore, the saturable reactor 244 is ready to limit the effects of the gate circuit 114 once again. By limiting the duration of the potential at the bus 152 by means of the saturable winding 244, the gate circuits of an added oscillator are only affected by this potential for a short time after the multivibrator corresponding to the gate circuits 114 and 116 changes its state of conduction.

The resistor 246 and the saturable reactor 248 affect the voltage at the winding 134_s_4 in a similar manner. Thus, the potential coupled by the rectifier 166 to the bus 158 when the winding 134_s_4 is positive at its no-dot end lasts only until current flow from the winding 134_s_4 saturates the saturable winding 248. No matter which of the gate circuits of an oscillator is triggered, the added resistor and saturable reactor therein limit the time during which the gate circuit can affect the remaining oscillators and limits the phase angle during which a corresponding oscillator can be affected.

Figure 4:
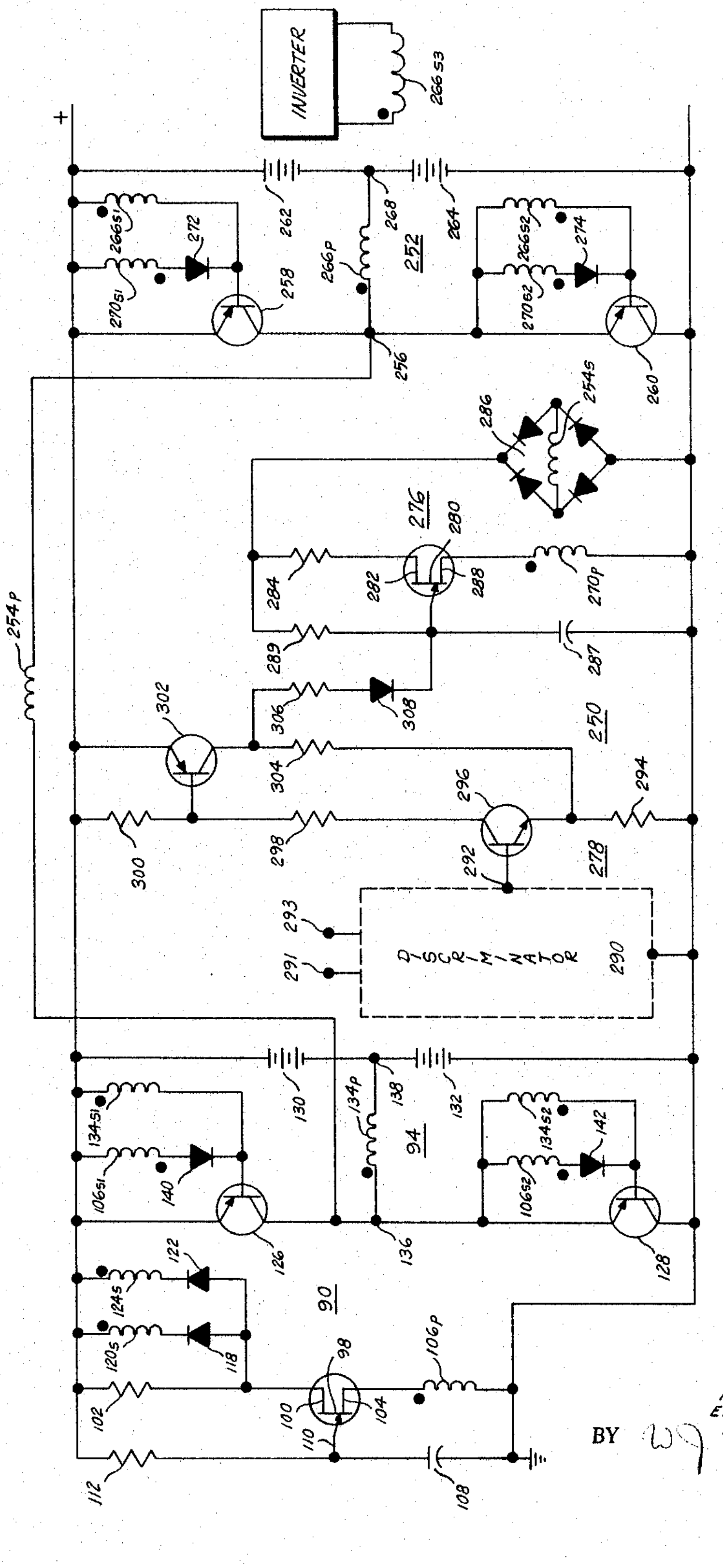
FIGURE 4 is a schematic diagram of a phase control circuit constructed in accordance with another aspect of this invention.

As pointed out above, it is often desirable not only to synchronize the oscillation of a plurality of oscillators, but also to provide output signals from each, at predetermined phase angles as well as at a single frequency of oscillation. It is also advantageous to adjust the phase angle at which this signal occurs to compensate for any unbalance in the load current detected by a discriminator circuit. FIGURE 4 shows a modification of the basic oscillator and multivibrator circuits, using the oscillator 90 and the multivibrator 94 as examples, wherein these desirable ends can be accomplished.

The oscillator circuit 90 and the multivibrator 94 may be used in conjunction with a pair of gate circuits such as the gate circuits 114 and 116 shown in FIGURE 2. Furthermore, the frequency of the oscillator 90 may be synchronized with that of one or a plurality of other oscillators as shown in FIGURES 1 and 2.

The circuit shown in FIGURE 4 adds a phase shift circuit 250 and a secondary multivibrator 252 to the oscillator circuit 90 and the multivibrator 94. A primary winding 254_p_ of a transformer 254 interconnects the junction point 136 in the multivibrator 94 and a junction point 256 between a pair of transistors 258 and 260 in the secondary multivibrator 252. The transistors 258 and 260 are connected across a source of positive potential comprising a battery 262 and a battery 264. The emitter electrode of the transistor 258 is connected to the most positive terminal of the source, while the collector electrode of the transistor 260 is connected to the most negative terminal. A primary winding 266_p_ of a transformer 266 is connected between the junction point 256 and a junction point 268 between the batteries 262 and 264. Secondary windings 266_s_1 and 266_s_2 of the transformer 266 are connected in the base-emitter circuits of the transistors 258 and 260, respectively. A secondary winding 270_s_1 of a transformer 270 is connected in series with a rectifier 272 between the base and emitter electrodes of the transistor 258. Similarly, the secondary winding 270_s_2 is connected in series with a rectifier 274 between the base and emitter electrodes of the transistor 260. A load circuit which may take the form of an inverter is driven by signals coupled through a secondary winding 266_s_3.

The phase shift circuit 250 can be conveniently divided into two parts for the purposes of discussion, a constant phase shift circuit 276 and a circuit for varying the phase shift 278. The constant phase shift circuit 276 includes a unijunction transistor oscillator comprising a UJT 280 having a base two electrode 282 connected through a resistor 284 to a source of positive potential comprising a bridge rectifier circuit 286. A base one electrode 288 is coupled through a primary winding 270_p_ of the transformer 270 to the grounded second terminal of the bridge rectifier 286. A secondary winding 254_s_ is the source of alternating voltage which the bridge circuit 286 rectifies. This alternating voltage is generated when a difference in potential between the junction points 136 and 256 causes current to flow through the primary winding 254_p_.

The time constant of the UJT oscillator, which determines the phase shift provided by the constant phase shift circuit 276, is dependent upon the time it takes the voltage from the bridge circuit 286 to charge a capacitor 287. This voltage charges the capacitor 287 through a resistor 289 to the stand-off ratio of voltage for the UJT 280, after which the capacitor 287 is discharged through the winding 270_p_.

The phase shift varying circuit 278 includes a discriminator circuit 290 which senses a particular characteristic of a load device which is to affect the phase of a signal coupled through the secondary winding 266_s_3 to the load circuit. The discriminator 290 is coupled to the load device through its input terminals 291 and 293. Where the load circuit is an inverter the input terminals 291 and 293 are coupled to circuit positions where the discriminator 290 can sense the portion of the total load current actually supplied by an individual inverter. The discriminator 290 may be a reactive current sensing discriminator which, as explained above, senses the portion of the reactive component of the load current provided by the driven inverter. The discriminator circuit 290 provides an output signal which establishes a proper phase relationship between this inverter and the other inverters supplying current to some load device in order to secure reactive current balance. The output from the discriminator 290 is applied through a junction point 292 and a resistor 294 to the base and emitter electrodes of a transistor amplifier 296. The output from the transistor 296 is coupled through a resistor 298 and a resistor 300 to a transistor 302 which further amplifies the signal. A resistor 304 interconnects the emitter electrode of the transistor 296 and the collector electrode of the transistor 302.

The output signal from the transistor 302 is fed through a resistor 306 and a rectifier 308 to the emitter electrode of the UJT 280 where it charges the capacitor 287 in conjunction with the current flowing through the resistor 289. It can be seen that an increase or a decrease in the output from the discriminator 290, effecting an increase or decrease in the output signal from the transistor 302, causes the capacitor 287 to charge at a correspondingly faster or slower rate.

In considering the operation of the circuit shown in FIGURE 4, it should be remembered that absent synchronizing signals from a higher frequency oscillator, the oscillator 90 drives the multivibrator 94 when the voltage at the capacitor 108 reaches the stand-off ratio of the UJT 98. Then the capacitor 108 is discharged through the winding 106*p*, and the resulting signal is transformed to the secondary windings 106*s*1 and 106*s*2. The signals at these windings cause the transistors 126 and 128 to reverse their conduction states, thereby reversing the polarity of the voltage developed across the winding 134*p*.

In discussing the operation of the phase shift circuit 250, let it be assumed that the voltage at the junction point 292 between the discriminator 290 and the transistor amplifier 296 is very low. Therefore, no current is supplied from the transistor 302 and through the resistor 306 and the rectifier 308 to affect the charging rate of the capacitor 287.

The secondary multivibrator 252 is designed to operate similar to the multivibrator 94. Either the transistor 258 is conducting to apply the potential of the battery 262 across the primary winding 266*p*, or the transistor 260 is conducting to apply the potential of the battery 264 across the primary winding 266*p*. Therefore, the dot end of the winding 266*p* will be either positive or negative in potential, respectively, with respect to the no-dot end. It can be assumed that the batteries 130, 132, 262, and 264 are of the same type so that each has the same potential differences thereacross.

The constant phase shift circuit is energized when the potential at the junction point 136 in the multivibrator 194 differs from that at the junction point 256 in the secondary multivibrator 252. This condition occurs whenever the transistor 126 is conducting at the same time as the transistor 260, or the transistor 128 is conducting at the same time as the transistor 258. A current flows through the winding 254*p* to induce a voltage in this winding. A voltage is also induced in the secondary winding 254*s* to supply a voltage for the bridge circuit 286. The rectified voltage from the bridge circuit charges the capacitor 287 through the resistor 289. When the potential across the capacitor 287 reaches the stand-off voltage level of the UJT 280, the capacitor 287 is discharged through the winding 270*p*. Since a voltage is induced across the winding 270*p*, positive in polarity at the dot end, a voltage of the same polarity is induced in the secondary windings 270*s*1 and 270*s*2 in the base-emitter circuits of the transistors 258 and 260, respectively.

Assuming that the transistor 260 was conducting, the voltage transformed to the winding 270*s*2 is applied through a rectifier 274 to the base electrode of the transistor 260 to counteract the forward biasing potential applied by means of the winding 266*s*2. The transistor 260 begins to turn off. This decreases the negative potential at the dot end of the winding 266*p* and causes the winding to become a current generator. A more positive voltage is generated at the dot end of this winding. This voltage induces a voltage in the winding 266*s*2 which causes the transistor 260 to turn off more fully. The voltage induced in the winding 266*s*1 begins to forward bias the base-emitter junction of the transistor 258 to turn it on. The interaction between the transformer 266 and the transistors 258 and 260 continues until the transistor 258 is conducting and the transistor 260 is turned off. Thus, an output signal is coupled through the winding 266*s*3 a predetermined time after the oscillator 90 drives the multivibrator 94.

The potential of the junction points 136 and 256 is now the same. When the oscillator 90 drives a multivibrator 94 once again, a potential difference occurs between these junction points to initiate the time delay or phase shift once again. For the stated conditions where the potential at the junction point 292 between the discriminator 290 and the transistor amplifier 296 is of a lower value, the potential at the junction point 256 always follows that at the junction point 136 by a predetermined time delay. For a fixed frequency of oscillation, this time delay corresponds to a fixed phase angle.

Where the phase angle at which the potential at the junction point 256 follows that at the junction point 136 is to be varied, the phase shift varying circuit 278 is also considered. The discriminator 290 provides an output signal at the junction point 292 which is proportional to the change in the load current which a circuit driven by the secondary multivibrator 252 must assume. When the inverter must be fired earlier in the cycle, a greater voltage is applied to the junction point 292. This voltage is amplified by the transistor amplifiers 296 and 302. The output signal from the transistor 302 charges the capacitor 287 through the resistor 306 and the rectifier 308. With this added charging current the capacitor 287 reaches the stand-off voltage sooner in the cycle of the oscillator 90. Therefore, the UJT 280 discharges the capacitor 287 through the primary winding 270*p* to cause the multivibrator 252 to fire the inverter earlier in the cycle of the oscillator 90.

When the discriminator 290 senses that the inverter should be fired later in the cycle of the oscillator 90, a smaller signal is applied to the junction point 292. This signal is amplified by the transistor amplifiers 296 and 302 and is applied through the resistor 306 and the rectifier 308 to charge the capacitor 287. This smaller signal causes the capacitor 287 to be charged at a lesser rate. Thus, the potential across the capacitor 287 reaches the stand-off voltage level later in the cycle of the oscillator 90, thereby causing the secondary multivibrator 252 to fire the inverter circuit later in the cycle of the oscillator 90.

This invention is not limited to the particular details of the embodiments illustrated, and it is contemplated that various modifications and applications will occur to those skilled in the art. It is therefore intended that the appended claims cover such modifications and applications as do not depart from the direct spirit and scope of this invention.

What I claim as new and desire to secure by Letters Patent of the United States is:

1. A circuit for synchronizing a plurality of oscillators comprising in combination a plurality of oscillators, gate circuit means for each of said oscillators, first means interconnecting each of said oscillators with its said gate circuit means for driving said gate circuit means in response to the oscillation of said oscillators, second means interconnecting said gate circuit means of said oscillators for causing a first driven gate circuit means to activate said gate circuit means of others of said plurality of oscillators, third means interconnecting each of said oscillators with output means of its said gate circuit means for causing said first driven gate circuit means to synchronize the oscillation of said plurality of oscillators.

2. A circuit according to claim 1 including means responsive to said first means for coupling output signals to a load.

3. A circuit according to claim 1 wherein said gate circuit means include volt-second gating means for limiting output signals from said gate circuit means.

4. A circuit according to claim 1 including phase shifting means connected in circuit with each of said oscillators and responsive to said first circuit means for developing phase shifted output signals.

5. A circuit according to claim 4 including means interconnecting output means of each of said shifting means with a load device, means for detecting a characteristic of said load device, and means responsive to the last-named means for modifying the phase shift of the output signal in response to changes in the detected characteristic.

6. A circuit according to claim 1 wherein said first means comprises a first bistable circuit, the circuit also including a second bistable circuit for each of said oscillators, phase shifting means responsive to said first and second bistable circuits for each of said oscillators for developing a phase shifted output signal.

7. A circuit for synchronizing a plurality of oscillators for driving a plurality of inverters comprising in combination a plurality of relaxation oscillators, gate circuit means for each of said oscillators, bistable switching means interconnecting each of said oscillators with its said gate circuit means for driving said gate circuit means in response to the oscillation of said oscillators, coupling means responsive to said switching means and connected in circuit with the inverters for causing said oscillators to drive the inverters, second means interconnecting said gate circuit means of said oscillators for causing a first driven gate circuit means to activate said gate circuit means of others of said plurality of oscillators, third means interconnecting each of said oscillators with output means of its said gate circuit means for causing said first driven gate circuit means to synchronize the oscillation of said plurality of oscillators.

8. A circuit according to claim 7 wherein said gate circuit means include volt-second gating means for limiting output signals from said gate circuit means.

9. A circuit according to claim 7 including phase shifting means connected in circuit with said switching means and said coupling means for developing phase shifted output signals for the inverters.

10. A circuit according to claim 9 wherein said phase shifting means include means for detecting the fraction of the total current from the plurality of inverters which is delivered by each of the inverters, and means responsive to said detecting means for modifying the phase shift of the output signals in response to changes in the fraction of the total current delivered by each inverter.

11. A circuit for synchronizing a plurality of oscillators comprising in combination a plurality of oscillators, a plurality of multivibrators each having a first output means and a second output means, first means for causing each of said oscillators to drive a multivibrator, a plurality of first and second gate circuits each having a first and second input terminal and an output terminal, second means interconnecting said first output means of each of said multivibrators with said first input terminal of a first gate circuit, third means interconnecting said second output means of each of said multivibrators with said first input terminal of a second gate circuit, fourth means for coupling said first output means of each of said multivibrators to said second input terminal of each of said second gate circuits of others of said plurality of multivibrators, fifth means for coupling said second output means of each of said multivibrators to said second input terminal of said first gate circuits of others of said plurality of multivibrators, sixth means for coupling said output terminals of said first and second gate circuits to said corresponding oscillators so that the output of either of said first and second gate circuits can drive said oscillator.

12. A circuit according to claim 11 wherein said gate circuit means include volt-second gating means comprising a saturable winding for limiting output signals from said gate circuit means.

13. A circuit according to claim 11 wherein said fourth and fifth means include means for blocking signals coupled from one multivibrator from the circuit of another multivibrator.

14. A circuit according to claim 11 wherein said first, second, third, fourth, fifth, and sixth means include magnetic coupling means.

15. A circuit according to claim 14 including a second multivibrator for each of said oscillators, means responsive to the first-mentioned multivibrators for coupling an output signal to each of a plurality of inverters, phase shifting means responsive to said first and second multivibrators for each of said oscillators for developing phase shifted output signals, means for detecting the fraction of the total current from the plurality of inverters which is delivered by each of the inverters, and means responsive to said detecting means for modifying the phase shift of the output signals in response to changes in the fraction of the total current delivered by each inverter.

No references cited.

NATHAN KAUFMAN, *Primary Examiner.*

J. KOMINSKI, *Assistant Examiner.*